US012226864B2

(12) United States Patent
Schwenk

(10) Patent No.: US 12,226,864 B2
(45) Date of Patent: Feb. 18, 2025

(54) APPARATUS FOR SUPPORTING A WORKPIECE FOR A PLURALITY OF SUPPORTING PINS WHICH ARE ORIENTED PARALLEL AND ARE INDIVIDUALLY LONGITUDINALLY MOVABLE

(71) Applicant: Matrix GmbH Spannsysteme und Produktionsautomatisierung, Ostfildern-Nellingen (DE)

(72) Inventor: Joachim Schwenk, Fluorn-Winzeln (DE)

(73) Assignee: Matrix GmbH Spannsysteme und Produktionsautomatisierung, Ostfildern-Nellingen (DE)

( * ) Notice: Subject to any disclaimer, the term of this patent is extended or adjusted under 35 U.S.C. 154(b) by 175 days.

(21) Appl. No.: 17/702,012

(22) Filed: Mar. 23, 2022

(65) Prior Publication Data

US 2022/0212300 A1    Jul. 7, 2022

Related U.S. Application Data

(63) Continuation of application No. PCT/EP2020/077379, filed on Sep. 30, 2020.

(30) Foreign Application Priority Data

Sep. 30, 2019    (DE) .................... 10 2019 126 361.1

(51) Int. Cl.
*B23Q 1/44*        (2006.01)
*B23Q 1/03*        (2006.01)
(Continued)

(52) U.S. Cl.
CPC ............... *B23Q 1/44* (2013.01); *B23Q 1/035* (2013.01); *B23Q 17/2485* (2013.01);
(Continued)

(58) Field of Classification Search
CPC ......... B25B 1/2421; B25B 5/14; B23Q 1/035; B23Q 1/44; B23Q 17/2485
(Continued)

(56) References Cited

U.S. PATENT DOCUMENTS 3,698,267 A * 10/1972 Denney ................. B25B 15/001
                                                          81/185
5,608,206 A    3/1997 Friedman
(Continued)

FOREIGN PATENT DOCUMENTS

CN    108620910 A    10/2018
DE    4339102 A1     6/1994
(Continued)

OTHER PUBLICATIONS

DE202014100965U1 EspaceNet Translation (Year: 2014).*
(Continued)

*Primary Examiner* — Makena S Markman
(74) *Attorney, Agent, or Firm* — Thomas | Horstemeyer, LLP

(57) ABSTRACT

An apparatus for supporting a workpiece has a frame and a supporting field consisting of end faces of a plurality of supporting pins which are guided parallel to one another in their main extension directions in the frame and which can each be pushed in against a restoring force with respect to the frame. Further, the apparatus has a detection device including a light barrier in order to detect relative positions of at least some of the supporting pins with respect to the frame. A light source and a light sensor of the light barrier are facing one another across the main extension directions of the supporting pins. The light source is divided into a plurality of sub-sources along one side of the supporting field, and the light sensor is divided into a plurality of
(Continued)

sub-sensors along another side situated opposite the aforementioned side of the supporting field.

14 Claims, 3 Drawing Sheets

(51) Int. Cl.
    *B23Q 17/24*     (2006.01)
    *B25B 1/24*     (2006.01)
    *G01V 8/20*     (2006.01)

(52) U.S. Cl.
    CPC .............. *B25B 1/2421* (2013.01); *G01V 8/20* (2013.01); *B23Q 17/2476* (2013.01)

(58) Field of Classification Search
    USPC ................................................ 269/54.5, 266
    See application file for complete search history.

(56) References Cited

U.S. PATENT DOCUMENTS

| | | | |
|---|---|---|---|
| 5,688,013 A | 11/1997 | Sehrt | |
| 5,988,618 A | 11/1999 | Meintrup et al. | |
| 6,103,012 A | 8/2000 | Wemhoner et al. | |
| 6,374,710 B2* | 4/2002 | Kuo ..................... | B25B 13/105 81/448 |
| 6,558,489 B2* | 5/2003 | Dolker .................. | B25B 11/005 269/254 R |
| 7,886,637 B2* | 2/2011 | Campbell ............. | B25B 13/105 81/DIG. 11 |
| 2018/0111240 A1* | 4/2018 | Klugger ............. | B23Q 17/2485 |
| 2018/0356788 A1* | 12/2018 | Moersch ............. | G05B 19/406 |
| 2022/0193839 A1* | 6/2022 | Sugiura .................. | B23Q 1/035 |

FOREIGN PATENT DOCUMENTS

| | | |
|---|---|---|
| DE | 19611754 A1 | 10/1997 |
| DE | 19802320 A1 | 8/1999 |
| DE | 102007024674 A1 | 11/2008 |
| DE | 202014100965 U1 | 6/2015 |
| JP | S 60-175545 U | 11/1985 |
| JP | H 04-201041 A2 | 7/1992 |
| JP | H 08-001462 A2 | 1/1996 |
| JP | 2003-200325 A2 | 7/2003 |
| JP | 2019-117849 A2 | 7/2019 |

OTHER PUBLICATIONS

English Translation of international Preliminary Report on Patentability in related PCT Application No. PCT/EP2020/077379, mailed Apr. 5, 2022.

English translation of Japanese Search Report, dated Oct. 23, 2024, from related Japanese Application No. JP 2022-515527.

English translation of Japanese Office Action, dated Nov. 12, 2024, from related Japanese Application No. JP 2022-515527.

\* cited by examiner

APPARATUS FOR SUPPORTING A WORKPIECE FOR A PLURALITY OF SUPPORTING PINS WHICH ARE ORIENTED PARALLEL AND ARE INDIVIDUALLY LONGITUDINALLY MOVABLE

CROSS REFERENCE TO RELATED APPLICATIONS

This application is a continuation of International Application PCT/EP2020/077379 with an international filing date of Sep. 30, 2020 and claiming priority to German Patent Application No. DE 10 2019 126 361.1 entitled "Vorrichtung zum Abstützen eines Werkstücks mit einer Mehrzahl von parallel ausgerichteten und einzeln längsbeweglichen Stützstiften", filed on Sep. 30, 2019.

FIELD OF THE INVENTION

The invention relates to an apparatus for supporting a workpiece with a plurality of supporting pins which are oriented parallel and are individually longitudinally movable. The workpiece supported by such an apparatus may rest on the supporting pins or it may be clamped by means of the supporting pins against a similar or a different apparatus. Thus, the apparatus may be used as a so-called form chuck jaw. In combination with a similar or a different apparatus, the apparatus is also suitable for grabbing applications, i.e. particularly for forming a grabber adapting or already adapted to the respective workpiece.

BACKGROUND OF THE INVENTION

A holding device for workpieces, which is known from German patent application publication DE 198 02 320 A1 and U.S. Pat. No. 5,988,618 belonging to the same patent family, comprises a fixing device for fixing the supporting pins with respect to the frame. On the back sides of the supporting pins facing away from the workpiece, an open pressure chamber is provided that can be pressurized with pressurized air which can exit the pressure chamber towards the respective workpiece through free spaces between the supporting pins. The supporting pins may have a radial shoulder within the pressure chamber so that the pressurized medium loads the supporting pins towards the workpiece. In order to determine a relative position of the respective workpiece with respect to the frames by means of one of the supporting pins, a microswitch is arranged between a retainer plate which delimits the pressure chamber and through which a retainer rod passes through, that is screwed from the back into a main body of the supporting pin such that the radial shoulder is formed. The microswitch is operated by a collar at the free end of the retainer rod when the supporting pin is pressed into the frame to a certain extent. Instead of the microswitch, a position encoder may be provided which determines the exact relative position of the supporting pin with respect to the frame.

A handling device for mechanically gripping, holding, moving and handling of objects of any shape, which is known from German patent application publication DE 43 39 102 A1 and U.S. Pat. No. 5,688,013 belonging to the same patent family, essentially consists of a high number of holding pins to be lowered onto the objects to be grabbed, which are mounted in bore holes in a holding pin guiding plate such that they can be moved longitudinally, and which clamp the objects. By pushing the holding pins back by means of an ejector plate, the objects are released. At the holding pin guiding plate, a light barrier is arranged which outputs a signal as soon as the holding pins are longitudinally shifted with respect to the holding pin guiding plate and get into a beam path of the light barrier with their upper ends.

An apparatus for flexibly grabbing objects comprising a sensor is known from U.S. Pat. No. 5,608,206. The sensor has a plurality of holding pins for contacting and grabbing the objects. The holding pins are mounted within a mounting plate in a longitudinally moveable way. The holding pins engage into a sensor array by which a relative shift of the holding pins with respect to the mounting plate is optomechanically coded and registered. At a back end of each holding pin, a hollow cylinder provided with openings is arranged, into which light is axially radiated by means of an optical fiber. Ends of other optical fibers punctually face the outer circumference of the hollow cylinder such that, in different longitudinal positions of the respective holding rod and the hollow cylinder connected thereto, light out of the hollow cylinder enters into the ends of different combinations of the other optical fibers. There still is a need of an apparatus for supporting a workpiece which is configured for a simple but extensive survey of its function such that an integration of the apparatus into fully automatic production installations is possible, that allow for a completely monitored and documented production.

SUMMARY OF THE INVENTION

The present invention relates to an apparatus for supporting a workpiece. The apparatus comprises a frame and a plurality of supporting pins. Each supporting pin has an end face and a main extension direction. The supporting pins of the plurality of supporting pins are guided parallel to one another in their main extension directions in the frame. Each supporting pins of the plurality of supporting pins can be pushed-in against a restoring force with respect to the frame. A supporting field for the workpiece is made of the end faces of the supporting pins of the plurality of supporting pins. The apparatus further comprises a detection device including a light barrier configured to detect relative positions of at least some of the supporting pins of the plurality of supporting pins with respect to the frame. The light barrier has a light source and a light sensor, which face each other across the main extension directions of the at least some of the supporting pins of the plurality of supporting pins. Along one side of the supporting field, the light source is divided into a plurality of sub-sources, and, along another side of the supporting field facing the one side of the supporting field, the light sensor is divided into a plurality of sub-sensors.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
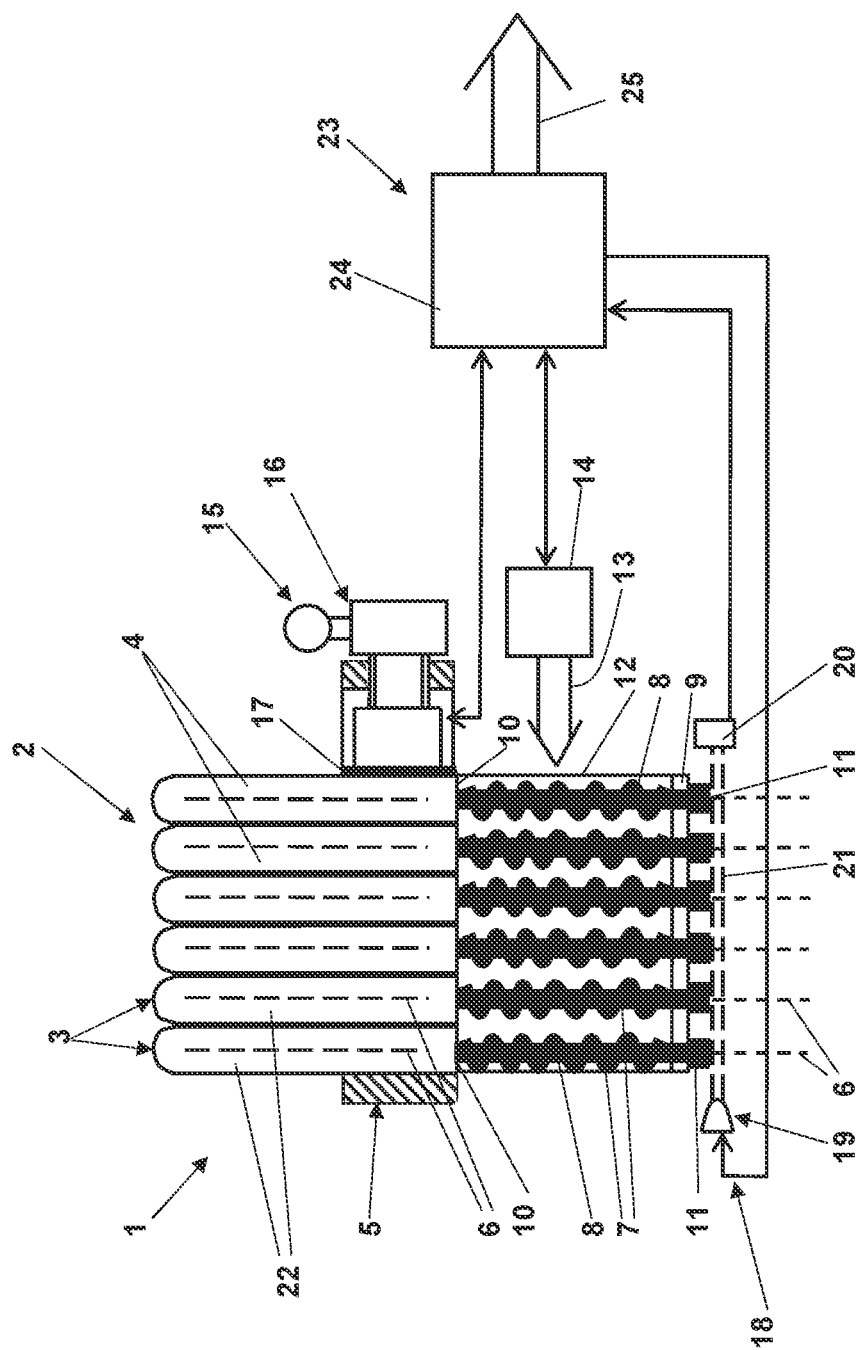
FIG. 1 is a schematic sectional view of an apparatus according to the invention for supporting a workpiece.

In an apparatus for supporting a workpiece comprising a frame and a supporting field made of end faces of a plurality of supporting pins which are guided parallel to one another in their main extension directions in the frame and which can each be pushed-in against a restoring force with respect to the frame, a detection device comprises a light barrier to detect relative positions of supporting pins of the plurality with respect to the frame. A light source and a light sensor of the light barrier are facing each other across the main extension directions of the supporting pins of the plurality. Along one side of the supporting field, the light source is divided into a plurality of sub-sources and, along another side of the supporting field facing the one side, the light sensor is divided into a plurality of sub-sensors.

With a suitable arrangement of the light source and the light sensor in the main extension directions and with regard to the main extension directions, it can be detected with the light barrier whether the supporting pins of the plurality, which are at least some and preferably all supporting pins of the plurality, are pressed-in with respect to the frame or not. Particularly suited for this purpose is an arrangement of the light source and the light sensor in which the not pressed-in supporting pins of the plurality are not in the light path of the light barrier between its light source and its light sensor, but get into this light path when being pressed-in and then block the light coming from the light source in front of the light sensor. The apparatus may detect a relative reduction of a light intensity presently registered by the light sensor of the light barrier with respect to a maximum intensity with free light path between the light source and the light sensor. This means that the apparatus does not only detect whether any or a certain minimum reduction of the light intensity is present. The relative reduction of the light intensity indicates to which extent the light path between the light source and the light sensor is blocked and thus how far the supporting pins and/or how many of the supporting pins of the plurality are pressed-in with respect to the frame.

Whether a certain relative reduction of the light intensity indicates a regular or a faulty function of the apparatus depends on the actual use of the apparatus. If the apparatus, for example, presently supports a workpiece, wherein the supporting pins are partially pressed-in with respect to the frame to adapt to a surface of the workpiece, a certain relative reduction of the light intensity registered by the light sensor is an indication of a regular function. If, however, the supporting pins are unloaded, so that they should be reset by the restoring forces with respect to the frame, any reduction of the registered light intensity is an indication of a failure. It is to be understood that the reduction of the registered light intensity is not mandatorily resulting from a pressed-in supporting pin. It may also result from the entry of contamination into the area of the light barrier. This is also be regarded as a failure of the apparatus.

As the light source of the light barrier of the apparatus is divided into a plurality of sub-sources along one side of the supporting field and the light sensor of the light barrier is subdivided into a plurality of sub-sensors along another side of the supporting field facing the one side, the light intensity detected for the light of the individual sub-sources and the sub-intensities detected by the individual sub-sensors allow for a spatial localization of the supporting pins pushed-in with respect to the frame. At best, it can be resolved which exact supporting pins within the supporting field are concerned. Practically, in this embodiment of the apparatus, a line array of sub-sources on the one side and a line array of sub-sensors on the other side of the supporting field may be used which are available as parts of low-cost commercial light barriers.

It is to be understood that it may even more accurately be determined where and which supporting pins are pressed-in with respect to the frame, if the light source is divided into a plurality of light sources along several adjoining sides of the supporting field, and the light sensor is divided into a plurality of sub-sensors along several other sides of the supporting field facing said several sides.

Practically, one sub-source and one sub-sensor of the light source may be assigned to each line and to each column of supporting pins of the supporting field.

Additionally, the light source may also be divided in several sub-sub-sources in the main extension directions of the supporting pins and the light sensor may be divided into several sub-sub-sensors in the main extension directions of the supporting pins. Then, it can be even more accurately resolved how far the supporting pins of the plurality are pushed-in with respect to the frame.

In order to obtain maximum information with regard to the positions of the individual supporting pins with respect to the frames with a light barrier having a light source including several sub-sources, the detection device may individually activate the sub-sources and separately detect the light intensities registered by the individual sub-sensors for the individually activated sub-sources. From the pattern of the registered light intensities, a related press-in pattern of the supporting pins may be deduced via a table of empirical values, or it may at least be acknowledged whether a press-in pattern of the supporting pins, which should actually be present, is in fact present or not.

Typically, the apparatus also has a fixing device by which the supporting pins can be fixed with respect to the frame. Thus, a certain press-in pattern of the supporting pins may be fixed by means of this fixing device. The detection device of the apparatus preferably activates the light barrier at least then, when the fixing device is deactivated to reset to supporting pins by means of their restoring forces. Then, the light source detects whether this resetting of the supporting pins actually took place or whether individual supporting pins have not been reset which indicates a failure.

In a practical embodiment of the apparatus, the supporting pins, with their ends facing away from the end faces, immerge into a chamber which can be pressurized with a pressure medium. Then, the detection device may be configured to especially activate the light barrier then, when the chamber is pressurized with the pressure medium and, if present, a fixing device is deactivated. Under these operating conditions, not only the restoring forces onto the supporting pins should be provided by means of the pressure medium, but also any contaminations between the supporting pins should be blown out of the pressure chamber and the free spaces between the supporting pins by means of the pressure medium. Correspondingly, the light path of the light barrier should be free. If, nevertheless, there is a reduction of the light intensity registered by the light sensor, this reduction indicates a failure.

In the apparatus, the detection device is preferably configured in such a way, i.e. a controller of the detection device is programmed in such a way, that the detection device automatically evaluates the light intensity registered by the light sensor of the light barrier for failure indications and outputs a failure signal, if a failure indication is present. It is even more preferred, if the detection device indicates a probable failure source and/or failure removal option by means of the error signal. In this way, valuable indications are given to the user of the apparatus. It is to be understood that the failure signal from the detection device of the apparatus may be used in an automatic production installation to stop the production installation to avoid a faulty production.

Referring now in greater detail to the drawings, the apparatus 1 depicted in FIG. 1 serves for supporting a workpiece which is not depicted here. For supporting the workpiece, the apparatus 1 comprises a supporting field 2 of end faces 3 of a plurality of supporting pins 4. Along a part of their length, the supporting pins 4 are enclosed by a frame 5 and guided parallel to one another in their main extension directions 6. In the main extension directions 6, the supporting pins 4 can be pressed-in against restoring forces with respect to the frame 5. The restoring forces are primarily provided by pressure springs 7 which are arranged on retainer rods 8. The retainer rods 8 which pass through a retainer plate 9 are screwed into the back ends 10 of main bodies 22 of the supporting pins 4. The pressure springs 7 are supported at the ends 10 at their one ends and at the retainer plate 9 at their other ends. Heads 11 with enlarged diameter of the retainer rods 8 abut against the back side of the retainer plate 9 and thus retain the supporting pins 4 at the retainer plate 9. A chamber 12 is formed between the ends 10 of the main bodies 22 and the retainer plate 9. The chamber 12 can be pressurized with pressurized air 13 from a pressurized air source 14 to apply additional restoring forces onto the supporting pins 4 (or even to replace the pressure springs 7) and to blow contaminations out of the free spaces between the supporting pins 4 which are of circular cross sections. By means of a fixing device 15 the supporting pins 4 can be fixed to the frame 5. Here, the fixing device 15 comprises a screw drive 16 which acts upon a pressure plate 17 that is movable with respect to the remainder of the frame 5 and laterally abuts against the main bodies 22 of the supporting pins 4 of the supporting field 2. Thus the supporting pins are clamped between the pressure plate 17 the remainder of the frame 5.

Figure 2:
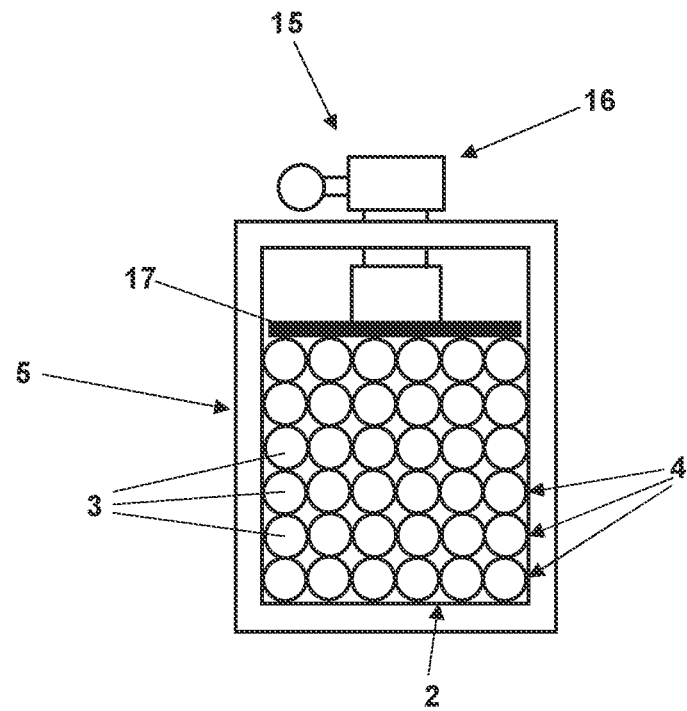
FIG. 2 is a plan view on a supporting field of the apparatus according to FIG. 1.

The arrangement of the fixing device 15 and the supporting pins 4 which form the supporting field 2 with their end faces 3 also emanates from the plan view according the FIG. 2. Here it is shown that the supporting pins 4 in the present embodiment of the apparatus are arranged in a square pattern. A hexagonal pattern is also possible.

For the purpose of function monitoring, the apparatus 1 comprises a detection device 23 having a light barrier 18. The light barrier 18 includes a light source 19 and a light sensor 20, which face one another across the main extension directions 6 of the supporting pins 4. In the main extension directions 6, the light source 18 is positioned such that, with completely reset supporting pins 2 as they are depicted in FIG. 1, their retainer rods 8 do not extend into the light path 21 between the light source 19 and the light sensor 20 of the light barrier 18. In this way, the light barrier 18 monitors whether the supporting pins 4 are not yet pressed-in or have already been completely reset. If only one of the supporting pins 4 with its retainer rod 18 extends into the light path 21, the light intensity registered by the light sensor 20 is reduced with respect to a maximum light intensity with free light path 21. If such a reduction of the light intensity occurs, although the supporting pins 4 should be reset, this indicates a failure of the apparatus 1. This failure is acknowledged by a controller 24 of the detection device 23, and results in that the controller 24 outputs a failure signal 25. The controller 24 also detects whether the fixing device 15 and the pressurized air source 14 are active, or it purposeful deactivates them which, however, requires a design of the fixing device 15 including an actuator.

Figure 3:
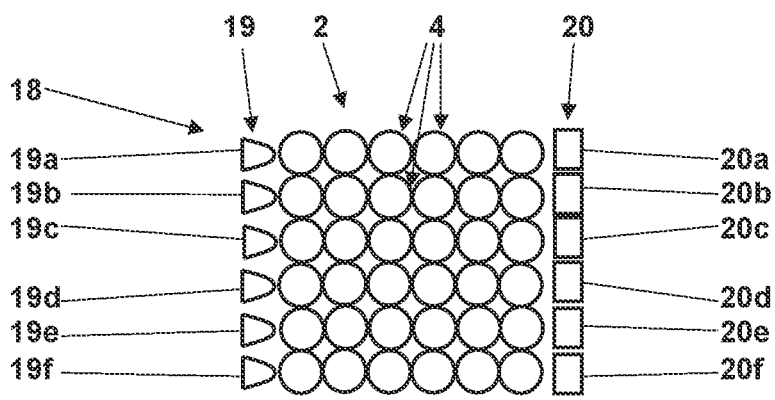
FIG. 3 shows an arrangement of sub-sources of a light source and sub-sensors of a light sensor of a light barrier of the apparatus according to FIG. 1 in a first embodiment.

FIG. 3 illustrates a division of the light source 19 of the light barrier 18 into six sub-sources 19a to 19f and of the light sensor 20 into six sub-sensors 20a to 20f, wherein each one sub-sensor 20a to 20f faces one of the sub-sources 19a to 19f across a row of supporting pins 14. By sequentially activating the sub-sources 19a to 19f and separately registering light intensities with the sub-sensors 20a to 20f, a supporting pin 4 getting into the light path 21 of the light barrier 18 with its retainer rod 8 can be localized or a number of supporting pins 4 getting into the light path 21 may be estimated and localized.

Figure 4:
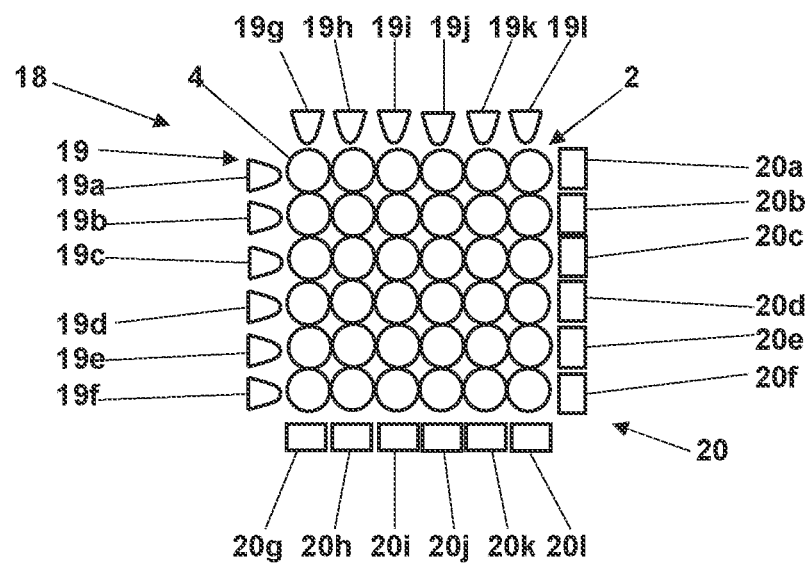
FIG. 4 shows an arrangement of sub-sources of the light source and sub-sensors of the light sensor of the light barrier of the apparatus according to FIG. 1 in a second embodiment.

With the light barrier 18 which is outlined in FIG. 4 and in which the light source 19 is divided into a total 12 sub-sources 19a to 19l and the light sensor 20 is divided into a total of 12 sub-sensors 20a-20l, wherein one sub-source 19a to 19l and one sub-sensor 20a to 20l face each other across each row and each column of the supporting pins 4 of the supporting field 2, it is even better possible to make this estimation.

Figure 5:
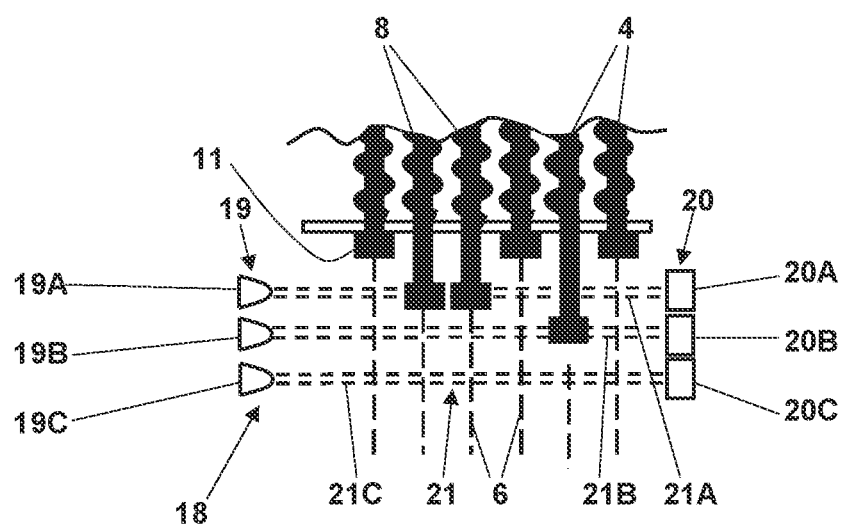
FIG. 5 shows a further arrangement of sub-sources of the light source and sub-sensors of the light sensor of the light barrier of a further apparatus according to the invention.

On the other hand, FIG. 5 outlines how dividing the light source 19 into three sub-sub-sources 19A to 19C and the light sensor 20 into three sub-sub-sensors 20A to 20C in the main extension directions 6 of the supporting pins 4 allows for better detecting how deep the supporting pins 4 are pressed-in, because, depending thereon, they enter into different sub-paths 21A to 21C of the light path 21 of the light barrier 18.

Many variations and modifications may be made to the preferred embodiments of the invention without departing substantially from the spirit and principles of the invention. All such modifications and variations are intended to be included herein within the scope of the present invention, as defined by the following claims.

I claim:
1. An apparatus for supporting a workpiece, the apparatus comprising:
   a frame,
   a plurality of supporting pins, each supporting pin of the plurality of supporting pins having a front end face and a main extension direction, wherein all of the supporting pins of the plurality of supporting pins are guided parallel to one another along the main extension directions in the frame, wherein each supporting pin of the plurality of supporting pins is configured to be pushed-in against a restoring force with respect to the frame, wherein the front end faces of all of the supporting pins of the plurality of supporting pins provide a supporting field for supporting the workpiece, and wherein each respective pin is configured to be restored by a respective spring, which supplies an individual restoring force, and a detection device including a light barrier configured to detect relative positions of at least some of the supporting pins of the plurality of supporting pins with respect to the frame, wherein the light barrier has a light source and a light sensor, wherein the light source and the light sensor face each other across the main extension directions of the at least some of the supporting pins of the plurality of supporting pins, wherein, along a first side of the supporting field, the light source is divided into a first plurality of sub-sources, and wherein, along a second side of the supporting field facing the first side of the supporting field, the light sensor is divided into a first plurality of sub-sensors, wherein:

along a third side of the supporting field adjoining the first side of the supporting field and running crosswise to the first side of the supporting field, the light source is divided into a second plurality of sub-sources, and wherein, along a fourth side of the supporting field adjoining the second side of the supporting field, running crosswise to the second side of the supporting field and facing the third side of the supporting field, the light sensor is divided into a second plurality of sub-sensors;

the supporting pins of the plurality of supporting pins are arranged in lines extending along the first and second sides of the supporting field and in columns extending along the third and fourth sides of the supporting field, and wherein one of the sub-sources of the first plurality of sub-sources and one of the sub-sensors of the first plurality of sub-sensors are assigned to each of the lines, and one of the sub-sources of the second plurality of sub-sources and one of the sub-sensors of the second plurality of sub-sensors are assigned to each of the columns;

the detection device is configured to individually activate the sub-sources of the light sensor and to separately record light intensities registered by the individual sub-sensors of the light sensor for the respective individually activated light source;

the detection device is configured to detect a relative reduction of a light intensity presently registered by one of the sub-sensors of the light sensor as compared to a maximum light intensity registered by the one of the sub-sensors with a free light path between the one of the sub-sensor and any sub-source of the light source presently activated by the detection device;

in the main extension directions, the sub-sources of the light source are further divided into pluralities of sub-sub-sources and wherein, in the main extension directions, the sub-sensors of the light sensor are further divided into pluralities of sub-sub-sensors;

the detection device is configured to individually activate the sub-sub-sources of the light sensor and to separately record light intensities registered by the individual sub-sub-sensors of the light sensor for the respective individually activated light source;

the detection device is configured to detect a relative reduction of a light intensity presently registered by one of the sub-sub-sensors of the light sensor as compared to a maximum light intensity registered by the one of the sub-sub-sensors with a free light path between the one of the sub-sub-sensor and any sub-sub-source of the light source presently activated by the detection device;

the sub-sub-sources and sub-sub-sensors define a plurality of sub-paths that are, respectfully, at different respective distances, in the main extension directions, from the front end faces of the supporting pins when the supporting pins aren't pressed in; and the sub-sub-sources and sub-sub-sensors are configured for detecting how deep the respective supporting pins are pressed in based on which, if any, of the sub-paths the respective supporting pins are positioned within.

2. The apparatus of claim 1, comprising a fixing device configured to be activated for fixing the supporting pins of the plurality of supporting pins to the frame.

3. The apparatus of claim 2, wherein the detection device is configured to activate the light barrier when the fixing device is deactivated.

4. The apparatus of claim 1, wherein the supporting pins, with back ends facing away from the front end faces immerge into a chamber configured to be pressurized with a pressure medium.

5. The apparatus of claim 4, wherein the detection device is configured to activate the light barrier when the chamber is pressurized with the pressure medium.

6. The apparatus of claim 1, wherein the detection device is configured to evaluate the light intensities registered by the light sensor of the light barrier with respect to failure indications and to put out a failure signal when any of the failure indications is present.

7. The apparatus of claim 6, wherein the detection device is configured to indicate at least one of a probable failure source and a failure removal option by means of the failure signal.

8. An apparatus for supporting a workpiece, the apparatus comprising:

a frame, a plurality of supporting pins, each supporting pin of the plurality of supporting pins having a front end face and a main extension direction, wherein the supporting pins of the plurality of supporting pins are guided parallel to one another along the main extension directions in the frame, wherein each supporting pin of the plurality of supporting pins is configured to be pushed-in against a restoring force with respect to the frame, and wherein the front end faces of the supporting pins of the plurality of supporting pins provide a supporting field for supporting the workpiece, wherein the supporting pins of the plurality of supporting pins are arranged in lines extending along parallel first and second sides of the supporting field and in columns extending orthogonally to the lines along parallel third and fourth sides of the supporting field, and wherein each respective pin is configured to be restored by a respective spring, which supplies an individual restoring force, and a detection device including a light barrier configured to detect relative positions of the supporting pins of the plurality of supporting pins with respect to the frame, wherein the light barrier has a light source and a light sensor, wherein the light source and the light sensor face each other across the main extension directions of the supporting pins of the plurality of supporting pins, wherein, along the first side of the supporting field, the light source is divided into a first plurality of sub-sources, and wherein, along the second side of the supporting field facing the first side of the supporting field, the light sensor is divided into a first plurality of sub-sensors, wherein, along the third side of the supporting field, the light source is divided into a second plurality of sub-sources, and wherein, along the fourth side of the supporting field facing the third side of the supporting field, the light sensor is divided into a second plurality of sub-sensors, and wherein one of the sub-sources of the first plurality of sub-sources and one of the sub-sensors of the first plurality of sub-sensors are assigned to each of the lines, and one of the sub-sources of the second plurality of sub-sources and one of the sub-sensors of the second plurality of sub-sensors are assigned to each of the columns of the supporting pins of the plurality of supporting pins, wherein:

the detection device is configured to individually activate the sub-sources of the light sensor and to separately record light intensities registered by the individual sub-sensors of the light sensor for the respective individually activated light source;

the detection device is configured to detect a relative reduction of a light intensity presently registered by one of the sub-sensors of the light sensor as compared to a maximum light intensity registered by the one of the sub-sensors with a free light path between the one of the sub-sensor and any sub-source of the light source presently activated by the detection device;

in the main extension directions, the sub-sources of the light source are further divided into pluralities of sub-sub-sources and wherein, in the main extension directions, the sub-sensors of the light sensor are further divided into pluralities of sub-sub-sensors;

the detection device is configured to individually activate the sub-sub-sources of the light sensor and to separately record light intensities registered by the individual sub-sub-sensors of the light sensor for the respective individually activated light source;

the detection device is configured to detect a relative reduction of a light intensity presently registered by one of the sub-sub-sensors of the light sensor as compared to a maximum light intensity registered by the one of the sub-sub-sensors with a free light path between the one of the sub-sub-sensor and any sub-sub-source of the light source presently activated by the detection device;

the sub-sub-sources and sub-sub-sensors define a plurality of sub-paths that are, respectfully, at different respective distances, in the main extension directions, from the front end faces of the supporting pins when the supporting pins aren't pressed in; and the sub-sub-sources and sub-sub-sensors are configured for detecting how deep the respective supporting pins are pressed in based on which, if any, of the sub-paths the respective supporting pins are positioned within.

9. The apparatus of claim 8, comprising a fixing device configured to be activated for fixing the supporting pins of the plurality of supporting pins to the frame.

10. The apparatus of claim 9, wherein the detection device is configured to activate the light barrier when the fixing device is deactivated.

11. The apparatus of claim 8, wherein the supporting pins, with back ends facing away from the front end faces immerge into a chamber configured to be pressurized with a pressure medium.

12. The apparatus of claim 11, wherein the detection device is configured to activate the light barrier when the chamber is pressurized with the pressure medium.

13. The apparatus of claim 8, wherein the detection device is configured to evaluate the light intensities registered by the light sensor of the light barrier with respect to failure indications and to put out a failure signal when any of the failure indications is present.

14. The apparatus of claim 13, wherein the detection device is configured to indicate at least one of a probable failure source and a failure removal option by means of the failure signal.

* * * * *